United States Patent Office 3,420,906
Patented Jan. 7, 1969

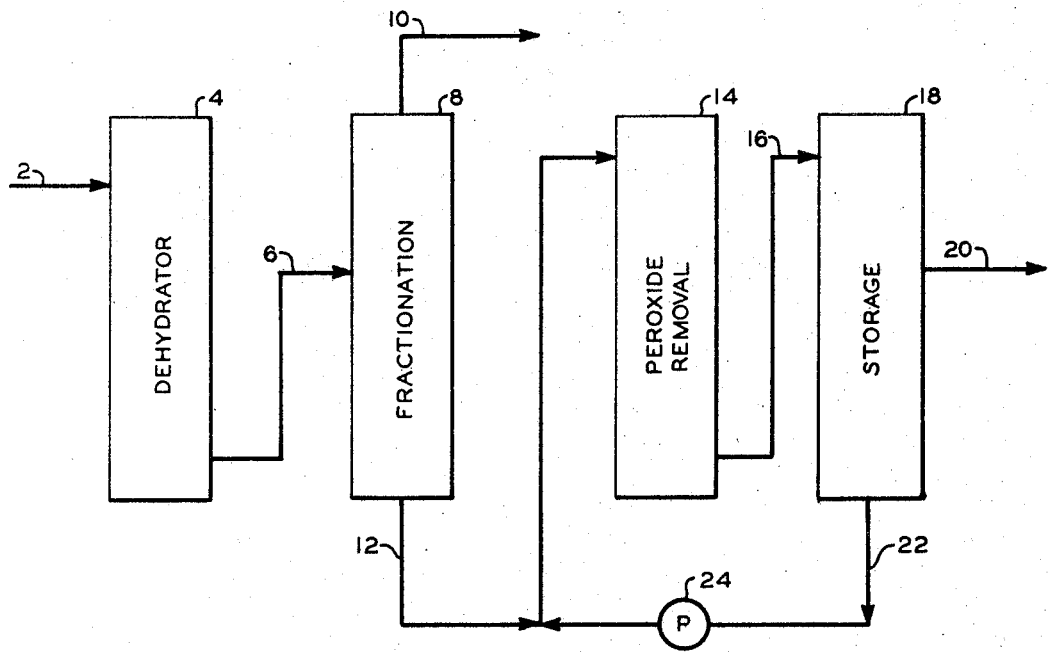

3,420,906
REMOVAL OF PEROXIDES FROM A
CYCLOHEXENE STREAM
Joe N. Singleterry, Phillips, Tex., assignor to Phillips
Petroleum Company, a corporation of Delaware
Filed July 24, 1967, Ser. No. 655,646
U.S. Cl. 260—666.5                         7 Claims
Int. Cl. C07c 7/18

ABSTRACT OF THE DISCLOSURE

The peroxide number of a peroxide-containing stream is reduced by contacting said stream with silica gel. The peroxide number of cyclohexene is reduced by contacting with silica gel.

Background of the invention

This invention relates to the treatment of a peroxide-containing stream to remove peroxide therefrom by contacting said stream with silica gel.

In the production of olefins, such as cyclohexene, by catalytic dehydration of alcohols, such as cyclohexanol, there are unavoidably formed some peroxides which can be organic or inorganic. The peroxides are undesirable in the olefin since they promote the conversion of olefins to other organic compounds.

When an olefin-containing mixture is allowed to stand for some time in contact with air, peroxides tend to form from the olefins. It is desirable to maintain a supply of olefins substantially peroxide free.

Summary of the invention

It is an object of this invention to provide a process for the removal of peroxides from a stream containing the same.

It is a further object of this invention to provide a process for reducing the peroxide number of a peroxide-containing olefin stream.

It is a still further object of this invention to provide a process for maintaining a body of olefins substantially peroxide free.

According to the invention, the peroxide number of a peroxide-containing stream is reduced by contacting the stream with silica gel.

Brief description of the drawing

The drawing is a schematic representation of a flow diagram of a plant in accordance with the invention.

Description of the preferred embodiments

The peroxide can be organic or inorganic. Inorganic peroxides include hydrogen peroxide while organic peroxides can be represented by the general formula ROOR' wherein R is alkyl, aryl, alkaryl, aralkyl or cycloalkyl, O is oxygen, and R' is hydrogen or R.

The peroxide number is the measure of the oxidizing constituents in a liquid. It is determined by ASTM D 1563 Test (vol. II, page 1527). The peroxide number specifically relates to the compounds which will oxidize potassium oxide.

The peroxide-containing stream can be any fluid, preferably liquid, stream containing a peroxide compound. In a preferred embodiment, a peroxide-containing stream will be an olefin, for example cyclohexene, containing stream.

The contacting of the stream takes place at a temperature in the range of −30 to 100°, preferably 10 to 30° C. The concentration of the peroxide in the liquid generally does not affect the separation of the peroxide from the liquid. Preferably, however, there should be 0.005 to 15, preferably 0.1 to 3.5, gallons of the silica gel for each 1000 gallons of the liquid being contacted. Within reasonable limits no more of the silica gel is required for a liquid having a relatively high peroxide number than is necessary for a liquid having a relatively low peroxide number, although more passes may be required for the liquid with the higher peroxide number. Generally, the limiting factor in determining how much liquid can be effectively treated to reduce the peroxide number with a given amount of the silica gel is the amount of moisture in the liquid. That is, the silica gel will become saturated with water before its effectiveness in reducing the peroxide number is impaired. The flow rate of the stream through the bed of the silica gel can vary over a wide range although at lower rates more peroxide is removed per pass. The time of contact of liquid with the silica gel bed can vary widely depending on the size of the bed relative to the volume of liquid. In a commercial operation using a two-gallon bed of silica gel to treat 2800 gallons of liquid being pumped through the bed at a rate of 15 gallons per minute, a time of 3 to 24 hours has proven satisfactory, although as little as 0.05 or as much as 100 hours can be used.

Any of the many forms of silica gel can be used in the practice of this invention. Refrigeration grade silica gel is particularly well suited for use in the practice of this invention.

The silica gel according to the invention can be mixed with other materials such as binders or other inert materials such as aluminum oxide.

The theory of operation is not understood, no logical explanation for the effect being apparent. It may be that something more complex than a simple decomposition of the peroxide occurs since it has further been found that not only is the peroxide number reduced by treatment in accordance with the instant invention, but the treated material stabilized with from 0.002 to 0.2, preferably 0.004 to 0.1, of 2,6-di-tert-butyl-p-cresol exhibits no appreciable tendency to reform peroxides even after standing for many months.

The invention will now be described with reference to the accompanying drawing which shows the embodiment of the invention.

Referring now to the figure, a feed stream 2 containing predominantly alcohols such as cyclohexanol is passed to a dehydrator 4 wherein the alcohols are catalytically converted to olefins with the subsequent formation of water. The catalytic dehydration can be any suitable method for converting alcohols to olefins. A suitable catalytic dehydration process comprises contacting this alcohol with activated alumina at a temperature in the range of 650° F.–700° F. at about atmospheric pressure. The effluent stream 6 containing predominantly olefins such as cyclohexene is passed to fractionation zone 8 wherein water and lighter products are removed as an overhead stream 10 and a stream containing predominantly cyclohexene and a small percentage of peroxides is removed from fractionation zone 8 through line 12. The cyclohexene-containing stream is then passed to a peroxide removal zone 14 in which silica gel is present in bed form. The cyclohexene-containing stream is passed over the silica gel bed in peroxide removal zone 14 to remove the peroxides from a cyclohexene-containing stream. The effluent stream 16 from the peroxide removal zone 14 contains substantially all the olefins such as cyclohexene. This cyclohexene-containing stream is passed to storage zone 18. Periodically or continuously, product cyclohexene is removed through line 20.

Upon sitting in the storage zone 18, some of the olefins may be converted to peroxide even under a blanket of nitrogen, although as previously noted olefins treated in accordance with the instant invention and stabilized with 2,6-di-tert-butyl-p-cresol do not reform peroxides to any significant extent. Periodically or continuously a small stream 22 can be removed from storage zone 18 and passed by pump 24 to line 12 to be recycled to the peroxide removal zone. In this manner, the peroxide level of the storage zone is kept below the required specification limits. It is also within the scope of this invention to treat an olefin-containing mixture which has been stored for some time (either with or without a stabilizing agent) after its initial synthesis.

In order to exemplify the invention, the following specific examples are given.

Example I

Fifteen hundred gallons of liquid containing predominantly cyclohexene and containing 0.02 weight percent 2,6-di-tert-butyl-p-cresol to inhibit the formation of peroxides were stored in a storage tank. The peroxide number of this liquid was 12.5. Two gallons of refrigeration grade silica gel were loaded into a 6" diameter by 4' long drying tube. A small stream of liquid was taken from the tank and passed through the drying tube and back to the storage tank.

After 16 hours of treatment, the peroxide number of the material in the tank had been reduced to 6.4. After 88 hours of passing the stream through the drying tube, the peroxide number of the liquid in the tank was reduced to 0.54. Purchasers of cyclohexenes specify that the peroxide number of the cyclohexene be below 2.0.

Example II

A liquid containing predominantly cyclohexene was treated by contacting with refrigeration grade silica gel. The peroxide number of the treated liquid was 0.2±0.1. This liquid was stabilized with 0.02 weight percent 2,6-di-tert-butyl-p-cresol and stored for 5 months. After the 5-month storage period the peroxide number was 0.4±0.1. For comparison an untreated, unstabilized sample of cyclohexene with an initial peroxide number of 0.5 had a peroxide number of 1.0 after 1 day, 6.7 after 3 days and 13.8 after 7 days.

While this invention has been described in detail for purpose of illustration it is not to be construed as limited thereby but is intended to cover all changes and modifications within the spirit and scope thereof.

What is claimed is:

1. A process for reducing the peroxide number of a stream comprising cyclohexene, said stream containing peroxide, said process comprising contacting said stream with silica gel.

2. A process according to claim 1 further comprising stabilizing said contacted stream with from 0.002 to 0.2 weight percent 2,6-di-tert-butyl-p-cresol prior to said contacting step.

3. A process according to claim 1 wherein said stream is an effluent stream from a catalytic dehydration process in which cyclohexanol is converted to cyclohexene.

4. A process according to claim 1 wherein the peroxide number of said stream is reduced below 2.0.

5. A process according to claim 1 wherein said silica gel is refrigeration grade silica gel.

6. A process according to claim 4 further comprising stabilizing said contacted stream with from 0.004 to 0.1 weight percent 2,6-di-tert-butyl-p-cresol prior to said contacting step.

7. A process according to claim 6 wherein said silica gel is refrigeration grade silica gel.

References Cited

UNITED STATES PATENTS

| | | | |
|---|---|---|---|
| 2,526,499 | 10/1950 | Paulsen | 208—307 |
| 2,563,598 | 8/1951 | Fuqua et al. | 260—681.5 |
| 2,629,744 | 2/1953 | Joris | 260—610 |
| 2,890,257 | 6/1959 | Ayers et al. | 208—307 |

DELBERT E. GANTZ, *Primary Examiner.*

G. E. SCHMITKONS, *Assistant Examiner.*